US012753885B2

(12) United States Patent
Koo

(10) Patent No.: US 12,753,885 B2
(45) Date of Patent: Oct. 6, 2026

(54) FUEL CHARGING MODULE AND FUEL CHARGING METHOD

(71) Applicants: Hyundai Motor Company, Seoul (KR); Kia Corporation, Seoul (KR)

(72) Inventor: Tae Gyeong Koo, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/949,722

(22) Filed: Nov. 15, 2024

(65) Prior Publication Data

US 2025/0282329 A1 Sep. 11, 2025

(30) Foreign Application Priority Data

Mar. 5, 2024 (KR) ........................ 10-2024-0031501

(51) Int. Cl.

| | |
|---|---|
| ***F17C 13/04*** | (2006.01) |
| ***B60S 5/02*** | (2006.01) |
| ***B67D 7/32*** | (2010.01) |
| ***B67D 7/36*** | (2010.01) |

(52) U.S. Cl.

CPC ................ *F17C 13/04* (2013.01); *B60S 5/02* (2013.01); *B67D 7/32* (2013.01); *B67D 7/36* (2013.01); *F17C 2221/012* (2013.01)

(58) Field of Classification Search

CPC ...... F17C 2227/0369; F17C 2227/0386; F17C 2221/012

See application file for complete search history.

(56) References Cited

U.S. PATENT DOCUMENTS

2022/0325853 A1* 10/2022 Allidieres ................ F17C 3/08
2024/0110669 A1* 4/2024 Hammer .................. F17C 3/08

FOREIGN PATENT DOCUMENTS

JP 3736414 B 1/2006

* cited by examiner

*Primary Examiner* — Timothy P. Kelly

(74) *Attorney, Agent, or Firm* — MORGAN, LEWIS & BOCKIUS LLP

(57) ABSTRACT

A fuel charging module includes a storage tank that stores a fuel, a supply pipeline that supplies the fuel supplied from a charging station, to the storage tank, a flow rate control valve mounted on the supply pipeline and located on an upstream side of the supply pipeline with respect to a flow direction of the fuel, a heat-exchange pad contacting with the storage tank for exchange of heat with the storage tank, and a heat-exchange pipeline connected to the flow rate control valve, and that supplies the fuel to the heat-exchange pad. The flow rate control valve may be configured to determine the flow direction of the fuel supplied through the receptacle as a flow direction of the storage tank or the heat-exchange pad.

12 Claims, 7 Drawing Sheets

FUEL CHARGING MODULE AND FUEL CHARGING METHOD

CROSS-REFERENCE TO RELATED APPLICATION

The present application claims priority to Korean Patent Application No. 10-2024-0031501, filed on Mar. 5, 2024, the entire contents of which is incorporated herein for all purposes by this reference.

BACKGROUND OF THE PRESENT DISCLOSURE

Field of the Present Disclosure

The present disclosure relates to a fuel charging module and a fuel charging method.

Description of Related Art

Recently, as awareness of the crisis over the environment and depletion of oil resources has increased, research and development on fuel cell vehicles (hydrogen fuel cell vehicles), which are eco-friendly vehicles, have been highlighted.

A fuel cell vehicle is a vehicle using a fuel cell that utilizes hydrogen as a fuel. The fuel cell vehicle may be powered by electricity obtained by reacting stored hydrogen and oxygen. For the present reason, the fuel cell vehicle needs to be charged with hydrogen from a charging station.

The fuel cell vehicle may include a receptacle which is coupled to the charging station and a storage tank for storing hydrogen. Then, when the fuel cell vehicle is charged with hydrogen from the charging station, the hydrogen supplied through the receptacle may be accommodated in a compressed state into the storage tank.

Because hydrogen is accommodated in the storage tank while being compressed, an internal temperature of the storage tank may rise due to heat of compression of the hydrogen, and for safety reasons, charging of hydrogen is stopped when the temperature of the storage tank reaches a specific temperature.

Accordingly, the charging speed of hydrogen may decrease, and a demand for a fuel charging module and a fuel charging method which may optimize the charging speed of hydrogen while the temperature of the storage tank that does not reach a specific temperature is increasing.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a fuel charging module and a fuel charging method which may optimize a charging speed of a fuel while the safety of a storage tank is ensured.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a fuel charging module includes a storage tank that stores a fuel, a supply pipeline that supplies the fuel supplied from a charging station, to the storage tank, a flow rate control valve mounted on the supply pipeline, a heat-exchange pad contacting with the storage tank for exchange of heat with the storage tank, and a heat-exchange pipeline connected to the flow rate control valve, and that supplies the fuel to the heat-exchange pad, and the flow rate control valve is configured to supply the fuel supplied through the charging station, to the storage tank or the heat-exchange pad.

The heat-exchange pipeline may be inserted into an interior of the heat-exchange pad.

The storage tank may extend in a first direction, and a plurality of storage tanks may be configured to be disposed in a second direction intersecting the first direction, and the heat-exchange pad may include accommodation recesses disposed on opposite sides of the plurality of storage tanks in a third direction intersecting the first direction and the second direction to accommodate the plurality of storage tanks, and support portions formed on sides of the accommodation recesses in the second direction to support sides of the storage tanks in the second direction, and into which the heat-exchange pipeline is inserted.

A plurality of support portions may be spaced apart from each other in the second direction while the accommodation recesses being interposed therebetween, and the heat-exchange pipeline may extend to pass through the plurality of support portions in the first direction.

The fuel charging module may further include a temperature detecting sensor which is configured to detect a temperature of the storage tank, and a processor that is configured to control the flow rate control valve so that a flow rate of the fuel supplied from the charging station to the storage tank is adjusted in response that the temperature of the storage tank reaches a reference temperature.

The processor is configured for controlling the flow rate control valve so that supply of the fuel to the storage tank is stopped and the fuel is supplied to the heat-exchange pipeline in response that the temperature of the storage tank reaches the reference temperature.

The processor is configured for controlling the flow rate control valve to increase the flow rate of the fuel supplied to the storage tank, and decrease the flow rate of the fuel supplied to the heat-exchange pipeline, in response that the temperature of the storage tank decreases to less than the reference temperature after the flow rate control valve is operated to supply the fuel to the heat-exchange pipeline.

The fuel charging module may further include a signal transmitter that transmits a signal to the charging station, and the processor may be configured to, control the signal transmitter to transmit a charging stop signal to the charging station, in response that the temperature of the storage tank is increased or maintained for a predetermined time period after the flow rate control valve is operated to supply the fuel to the heat-exchange pipeline.

The heat-exchange pipeline may include one end portion connected to the flow rate control valve, and an opposite end portion extending from the one end portion and formed on an opposite side to the one end portion, and the fuel charging module may further include a recovery pipeline connecting the opposite end portion of the heat-exchange pipeline and the charging station.

The heat-exchange pipeline may include one end portion connected to the flow rate control valve and an opposite end portion extending from the one end portion and formed on an opposite side to the one end portion, and the fuel charging module may further include a recovery pipeline connected to the opposite end portion of the heat-exchange pipeline, and a heat-exchange portion that exchanges heat between the fuel recovered through the recovery pipeline and the fuel supplied from the charging station.

The fuel charging module may further include a sub tank connected to the recovery pipeline, and which is spaced apart from the heat-exchange pad to accommodate the fuel recovered through the recovery pipeline, a sub pipeline connecting the sub tank and the storage tank to supply the fuel accommodated in the sub tank to the storage tank, and an opening/closing valve disposed on the sub pipeline.

The heat-exchange portion may be positioned on a location, where the supply pipeline crosses the sub pipeline.

According to another aspect of the present disclosure, a fuel charging method includes a connecting operation of connecting a receptacle to a charging station, a first fuel supplying operation of supplying a fuel from the charging station to a storage tank, a temperature measuring operation of measuring a temperature of the storage tank, and a tank cooling operation of controlling flow of the fuel supplied through the receptacle so that the fuel is directed to a heat-exchange pad in response that the temperature of the storage tank reaches a reference temperature or is more than the reference temperature.

The tank cooling operation may include controlling the flow of the fuel so that all the fuel supplied through the receptacle is directed to the heat-exchange pad.

The fuel charging method may further include a second fuel supplying operation of controlling the flow of the fuel supplied to the storage tank to increase the flow rate of the fuel in response that the temperature of the storage tank decreases to less than the reference temperature.

The second fuel supplying operation may include increasing a flow rate of the fuel supplied to the storage tank, and decreasing a flow rate of the fuel directed to the heat-exchange pad.

The fuel charging method may further include a flow rate maintaining operation of controlling the flow of the fuel to maintain the flow rate of the fuel supplied to the storage tank and the flow rate of the fuel directed to the heat-exchange pad in response that the temperature of the storage tank is maintained for a predetermined time period after the second fuel supplying operation.

The fuel charging method may further include a signal transmitting operation of transmitting a charging stop signal to the charging station in response that the temperature of the storage tank increases to the reference temperature or higher than the reference temperature or is maintained at the reference temperature or higher than the reference temperature.

The fuel charging method may further include a notifying operation of providing a notification to a user in response that the temperature of the storage tank increases to the reference temperature or higher than the reference temperature or is maintained at the reference temperature or higher than the reference temperature.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
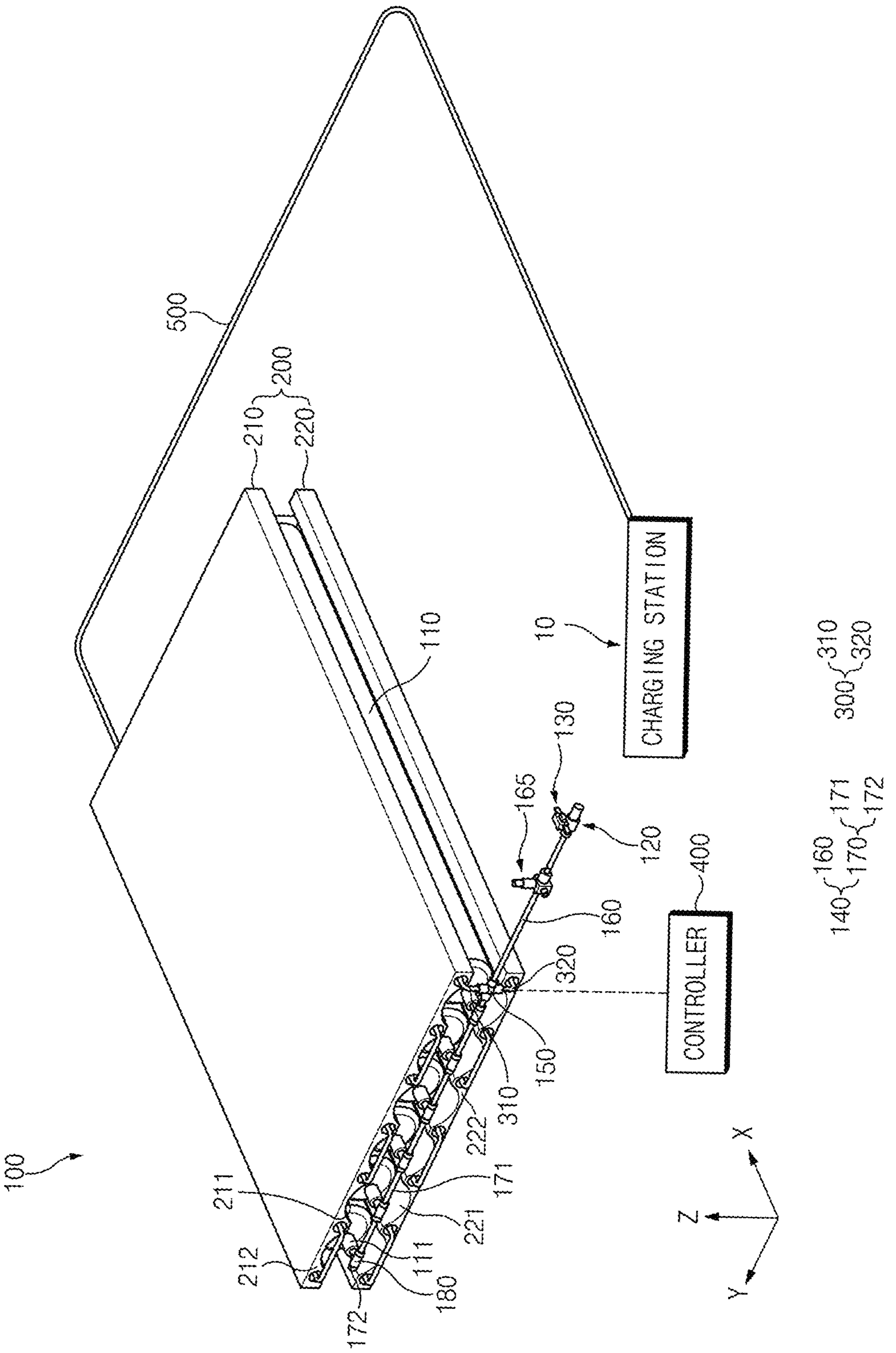
FIG. 1 is a perspective view of a fuel charging module according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In adding reference numerals to the components of the drawings, it is noted that the same components are denoted by the same reference numerals even when they are drawn in different drawings. Furthermore, in describing the exemplary embodiments of the present disclosure, when it is determined that a detailed description of related known configurations and functions may hinder understanding of the exemplary embodiments of the present disclosure, a detailed description thereof will be omitted.

Furthermore, in describing the components of the exemplary embodiments of the present disclosure, terms, such as first, second, "A", "B", (a), and (b) may be used. The terms are simply for distinguishing the components, and the essence, the sequence, and the order of the corresponding components are not limited by the terms. Unless defined differently, all the terms including technical or scientific terms include the same meanings as those generally understood by an ordinary person in the art, to which the present disclosure pertains. The terms, such as the terms defined in dictionaries, which are generally used, should be construed to coincide with the context meanings of the related technologies, and are not construed as ideal or excessively formal meanings unless explicitly defined in the present disclosure.

Hereinafter, various exemplary embodiments of the present disclosure will be described in detail with reference to FIGS. 1 to 7.

Figure 2:
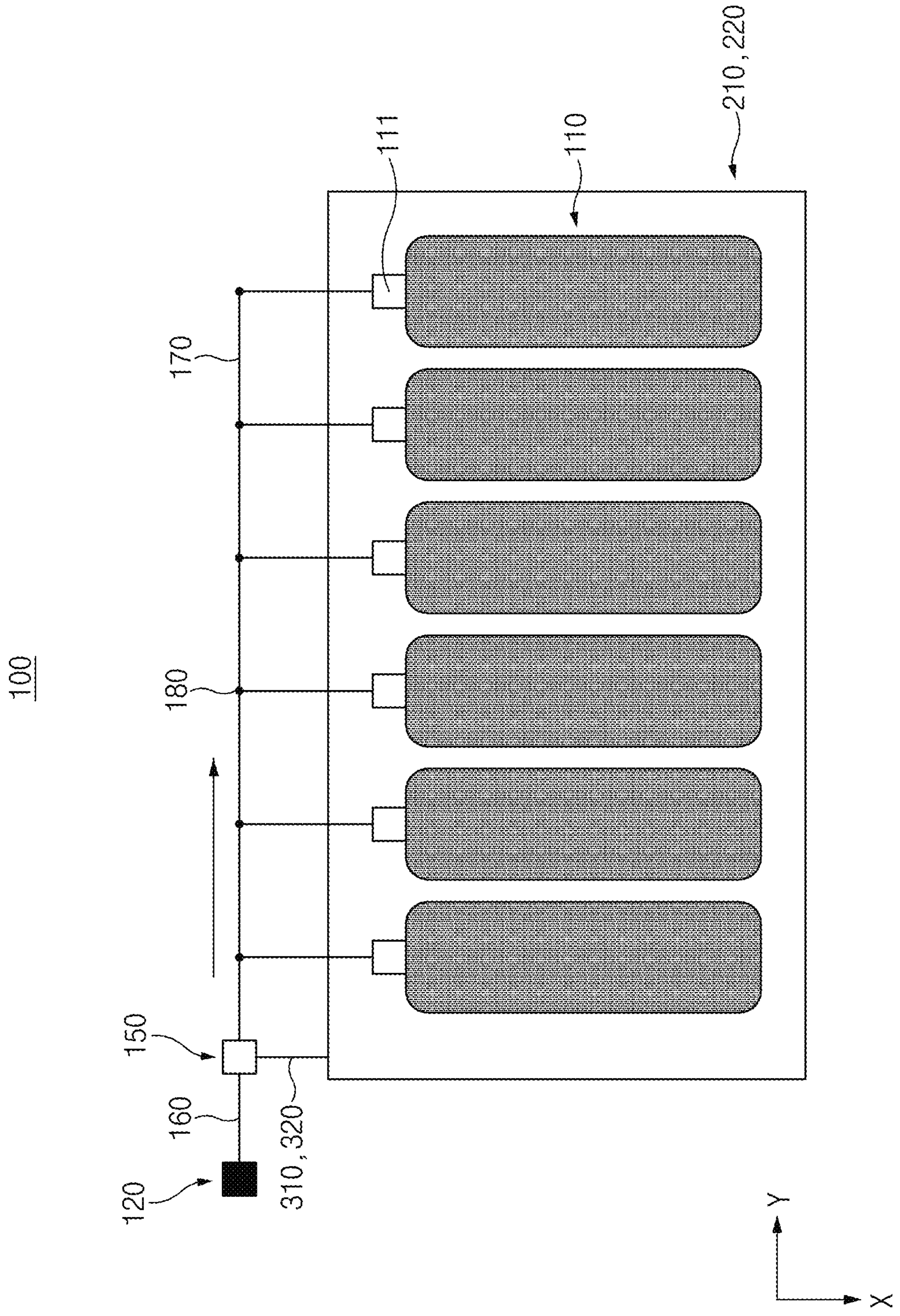
FIG. 2 is a schematic view exemplarily illustrating a state, in which a fuel is supplied to a storage tank according to an exemplary embodiment of the present disclosure.
Figure 3:
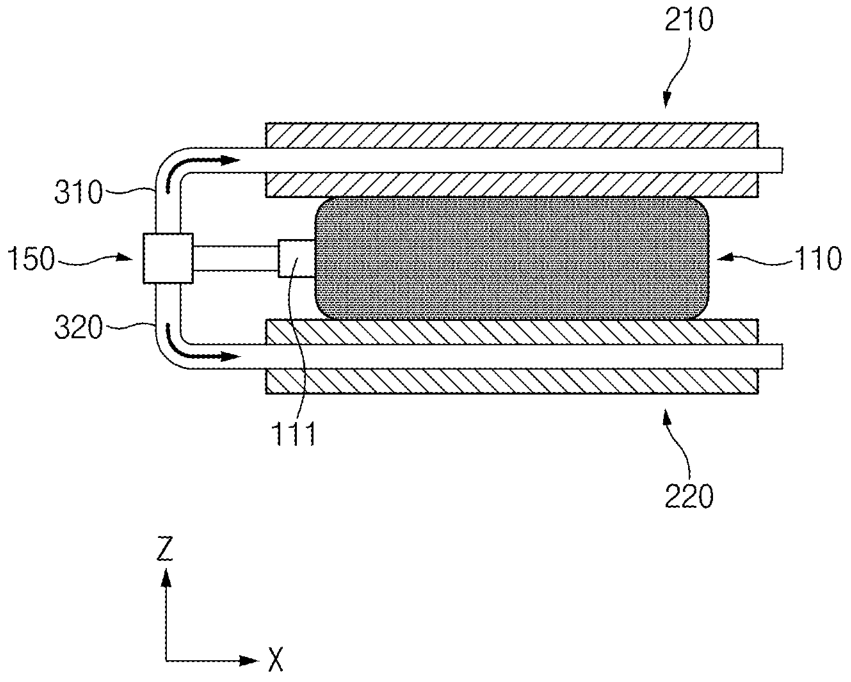
FIG. 3 is a longitudinal sectional view exemplarily illustrating a state, in which a fuel is supplied to a heat-exchange pipeline according to an exemplary embodiment of the present disclosure.

FIG. 1 is a perspective view of a fuel charging module according to an exemplary embodiment of the present disclosure. FIG. 2 is a schematic view exemplarily illustrating a state, in which a fuel is supplied to a storage tank according to an exemplary embodiment of the present disclosure; FIG. 3 is a longitudinal sectional view exemplarily illustrating a state, in which the fuel is supplied to a heat-exchange pipeline according to an exemplary embodiment of the present disclosure.

Referring to FIG. 1, FIG. 2, and FIG. 3, a fuel charging module 100 may be understood as a module which is mounted in an interior of a fuel cell vehicle (a hydrogen fuel cell vehicle) to receive hydrogen (hereinafter "a fuel") which is the fuel of the fuel cell vehicle (hereinafter "a vehicle") from a charging station 10 and store it.

The fuel charging module 100 may include a storage tank 110 which is configured to store the fuel, a receptacle 120 for connection to an external charging station 10, a signal transmitter 130 which is formed adjacent to the receptacle 120, and a supply pipeline 140 which is configured to supply the fuel supplied from the receptacle 120 to the storage tank 110.

The storage tank 110 may extend in a first direction (the "X" direction or an opposite direction to the "X" direction), and a plurality of storage tanks 110 may be provided to be disposed in a second direction (the "Y" direction or an opposite direction to the "Y" direction) that intersects the first direction. The plurality of storage tanks 110 may be spaced apart from each other in the second direction thereof.

The receptacle 120 may be a component for direct connection to the charging station 10 for the fuel charging module 100 to receive the fuel from the charging station 10.

A signal transmitter 130 may be formed adjacent to the receptacle 120. When the receptacle 120 and the charging station 10 are connected to each other, the signal transmitter 130 may transmit a connection signal of the receptacle 120 and the charging station 10 to the charging station 10.

For example, The signal transmitter 130 may transmit IR (Infrared Rays). Receiver may be attached to the nozzle of the charging station. When the nozzle and the receptacle 120 are connected, information may be exchanged through the signal transmitter 130 and the nozzle. In this way, because the signal transmitter 130 and the nozzle must be within a range where signals can be communicated with each other, the signal transmitter 130 needs to be located around the receptacle 120.

As another example, when the nozzle is fastened to the receptacle 120, a network between objects can be connected through interfaces such as QR codes and barcodes around the receptacle 120.

The signal transmitter 130 may transmit a ready signal of the fuel charging module 100 to the charging station 10 when the fuel charging module 100 is ready to receive the fuel from the charging station 10.

Furthermore, the signal transmitter 130 may transmit a charging stop signal of the fuel charging module 100 to the charging station 10, in a situation, in which the fuel charging module 100 may no longer receive the fuel from the charging station 10. As an exemplary embodiment of the present disclosure, when a pressure of any one of the plurality of storage tanks 110 is more than a predetermined reference pressure, the signal transmitter 130 may transmit the charging stop signal to the charging station 10. Accordingly, the predetermined reference pressure may be a pressure value excluding a specific error range from 350 bar*1.5.

The supply pipeline 140 may extend from the receptacle 120 to the storage tank 110, and may be configured to supply the fuel supplied from the receptacle 120, to the storage tank 110.

The fuel charging module 100 may include a flow rate control valve 150 which is disposed on the supply pipeline 140 and is located on an upstream side of the storage tank 110 in a flow direction of the fuel.

The supply pipeline 140 may include a first supply pipeline 160 that connects the receptacle 120 and the flow rate control valve 150, and a second supply pipeline 170 that connects the flow rate control valve 150 and the storage tank 110.

A pressure sensor 165 configured to detect the pressure of fuel that flows through the first supply pipeline 160 may be provided on the first supply pipeline 160.

The second supply pipeline 170 includes a main pipeline 171 which is connected to the flow rate control valve 150 and extends in the second direction, and a branch pipeline 172 which is branched from the main pipeline 171 and extends in the first direction.

The main pipeline 171 may extend between one end portion which is connected to the flow rate control valve 150, and an opposite end portion which is connected to the branch pipeline 172 which is most distant from the flow rate control valve 150.

A branch support portion 180 may support the second supply pipeline 170 at a portion, at which the main pipeline 171 and the branch pipeline 172 are connected to each other. The branch pipeline 172 may connect the main pipeline 171, and an inlet 111 of the storage tank 110.

A solenoid valve and the like may be formed in the inlet 111 of the storage tank 110. The solenoid valve formed in the inlet 111 may be configured to determine a flow rate of the fuel supplied into each of the storage tanks 110, or whether the fuel is supplied to an interior of each of the storage tanks 110. Furthermore, a temperature detecting sensor configured to detect the temperature of the storage tank 110 may be provided in the inlet 111.

Due to the present structure, the fuel charging module 100 may cause the fuel supplied through the receptacle 120 to pass through the first supply pipeline 160, the second supply pipeline 170, and the inlet 111 and flow into the storage tank 110.

Meanwhile, the fuel that flows into an interior of the storage tank 110 may be stored in a compressed state to increase an amount of the stored fuel. To achieve this, a pressure may be applied to the fuel, and through the present process, compression heat which is heat generated as the fuel is compressed may be dissipated from the interior of the storage tank 110. As the compression heat is radiated from the interior of the storage tank 110, an internal temperature of the storage tank 110 may rise, and for the safety of the storage tank 110, the storage tank 110 may be used only within a predetermined temperature range. As an exemplary embodiment of the present disclosure, the storage tank 110 may be used only within a range of −40 degrees Celsius to 85 degrees Celsius.

According to the fuel charging module 100 according to the exemplary embodiment of the present disclosure, the internal temperature of the storage tank 110 may be adjusted to improve a charging speed of the fuel charging module 100 while the storage tank 110 is used at a temperature within the above-described range.

The fuel charging module 100 may include a heat-exchange pad 200 that contacts with the storage tank 110 for exchange of heat with a plurality of storage tanks 110, and a heat-exchange pipeline 300 which is connected to the flow rate control valve 150 and is configured to supply the fuel to an interior of the heat-exchange pad 200.

The heat-exchange pad 200 may contact with the plurality of storage tanks 110 in a third direction (the "Z" direction or an opposite direction to the "Z" direction) that intersects the first and second directions of the plurality of storage tanks 110. The heat-exchange pad 200 may be formed to receive the heat from the plurality of storage tanks 110 to lower the temperature of the plurality of storage tanks 110.

The heat-exchange pad 200 may include a first heat-exchange pad 210 that exchanges heat with a plurality of storage tanks 110 on one side (the "Z" direction) of the plurality of storage tanks 110 in the third direction, and a second heat-exchange pad 220 that exchanges heat with the plurality of storage tanks 110 on an opposite side (an opposite direction to the "Z" direction) of the plurality of storage tanks 110 in the third direction thereof.

The first heat-exchange pad 210 and the second heat-exchange pad 220 may be formed to surround the plurality of storage tanks 110 on opposite sides of the plurality of storage tanks 110 in the third direction, respectively.

In more detail, the first heat-exchange pad 210 may include a first accommodation recess 211 which is disposed on one side of the plurality of storage tanks 110 in the third direction, and into which each of the storage tanks 110 is inserted, and a first support portion 212 which is formed on one side of the first accommodation recess 211 in the second direction thereof.

The second heat-exchange pad 220 may include a second accommodation recess 221 which is disposed on an opposite side of the plurality of storage tanks 110 in the third direction, and into which each of the storage tanks 110 is inserted, and a second support portion 222 which is formed on one side of the second accommodation recess 221 in the second direction thereof.

The first support portion 212 may define the first accommodation recess 211 on opposite sides of the first accommodation recess 211 in the second direction, and the second support portion 222 may define the second accommodation recess 211 on opposite sides of the second accommodation recess 221 in the second direction thereof.

A plurality of first support portions 212 and a plurality of second support portions 222 may be provided to be spaced apart from each other in the second direction while the first accommodation recess 211 and the second accommodation recess 221 being interposed therebetween.

The first accommodation recess 211 and the second accommodation recess 221 may be formed at positions corresponding to each other when viewed from the third direction thereof. Furthermore, the first support portion 212 and the second support portion 222 may be formed at positions corresponding to each other when viewed from the third direction thereof.

The plurality of storage tanks 110 may be inserted into and accommodated in the first accommodation recess 211 and the second accommodation recess 221, respectively. The first support portion 212 and the second support portion 222 may be disposed on opposite sides of the plurality of storage tanks 110 in the second direction to support the opposite sides of the plurality of storage tanks 110 in the second direction thereof.

The heat-exchange pipeline 300 may be inserted into the first heat-exchange pad 210 and the second heat-exchange pad 220. The heat-exchange pipeline 300 may include a first heat-exchange pipeline 310 which is inserted from the flow rate control valve 150 into the first heat-exchange pad 210, and a second heat-exchange pipeline 320 which is inserted from the flow rate control valve 150 into the second heat-exchange pad 220.

The first heat-exchange pipeline 310 may be inserted into an interior of the first heat-exchange pad 210 and extend to pass through each of the first support portions 212 of the first heat-exchange pad 210 in the first direction. The first heat-exchange pipeline 310 may first pass through, among the plurality of first support portions 212, the first support portion 212 which is closest to the flow rate control valve 150, and may extend to sequentially pass through, among the plurality of first supports 212, the remaining first support portions 212.

Similarly, the second heat-exchange pipeline 320 may be inserted into an interior of the second heat-exchange pad 220 and extend to pass through each of the second support portions 222 of the second heat-exchange pad 220 in the first direction. The second heat-exchange pipeline 320 may first pass through, among the plurality of second support portions 222, the second support portion 222 which is closest to the flow rate control valve 150, and may extend to sequentially pass through, among the plurality of second support portions 222, the remaining second support portions 222.

That is, the first heat-exchange pipeline 310 and the second heat-exchange pipeline 320 may extend to pass through the plurality of first support portions 212 and the plurality of second support portions 222 in the first direction. This is for increasing an area, by which the fuel that flows through the first heat-exchange pipeline 310 and the second heat-exchange pipeline 320 receives heat from the first heat-exchange pad 210 and the second heat-exchange pad 220, respectively.

Meanwhile, the flow rate control valve 150 may supply the fuel supplied through the charging station 10 to the storage tank 110 or the heat-exchange pad 200. In other words, the flow rate control valve 150 may be configured to determine a flow direction of the fuel to supply the fuel supplied through the receptacle 120 to the storage tank 110 and the heat-exchange pad 200.

The fuel charging module 100 may include a controller 400 that is configured to control the flow rate control valve 150 including an actuator operatively connected to the controller 400. The controller 400 may include memory and a processor. The memory may include a volatile memory, such as a static random access memory (S-RAM) and a dynamic random access memory (D-RAM) for temporarily storing data while electric power is supplied, and a nonvolatile memory, such as a read only memory (ROM) and an erasable programmable read only memory (EPROM) for preserving data even when supply of electric power is cut off.

The processor may include various logic circuits and operation circuits, may be configured for processing data according to a program provided from the memory and generate control signals according to the processing results.

When the receptacle 120 is completely connected to the charging station 10, as illustrated in FIG. 2, the fuel may flow to the second supply pipeline 170 through the flow rate control valve 150. Thereafter, the fuel may flow into the storage tanks 110.

Thereafter, as an amount of the fuel which is accommodated in the interior of the storage tank 110 increases over time, the temperature of the storage tank 110 may increase. The temperature of the storage tank 110 may be detected by a temperature sensor at specific time intervals. When the temperature of the storage tank 110 is not a reference temperature or higher than the reference temperature even over time, a state of the flow rate control valve 150 may be maintained. Here, a time difference may be about 10 ms.

The processor may detect the temperature of the storage tank 110 at intervals and may be configured to conclude that the temperature of the storage tank 110 is increased or decreased when the difference between the two temperatures deviates a predetermined error range.

Thereafter, when the temperature of the storage tank 110 detected by the temperature detecting sensor reaches a predetermined reference temperature, the processor is configured for controlling the flow rate control valve 150 to adjust the flow rate of the fuel supplied from the charging station 10 to the storage tank 110.

The flow rate control valve 150 may include a sensor, a control unit, a driving unit and a mechanical regulator. The driving unit may be an actuator. The driving unit may be provided within the valve or may be mounted outside of the flow rate control valve 150.

Sensor may monitor flow status of the fluid in real time by measuring flow rate, pressure, temperature, etc. Based on the data collected from the sensor, the control unit may determine whether to perform flow rate control using the PID control method. Afterwards, based on commands from the control unit, the driving unit may be operated electronically, such as an electric motor or solenoid. When the driving unit is activated, the mechanical regulator may adjust the degree of opening and closing of the flow rate control valve 150.

In more detail, when the temperature of the storage tank 110 reaches the reference temperature, as illustrated in FIG. 3, the processor is configured for controlling the flow rate control valve 150 so that the fuel supplied through the charging station 10 is directed to the first and second heat-exchange pipelines 310 and 320. Accordingly, the reference temperature may be a temperature excluded from 85 degrees Celsius by a specific error range.

When the temperature of the storage tank 110 reaches the reference temperature or increases to the reference temperature or higher than the reference temperature, the processor is configured for controlling the flow rate control valve 150 to stop the supply of the fuel to the storage tank 110 and supply the fuel to the first and second heat-exchange pipelines 310 and 320.

Accordingly, the flow rate control valve 150 may internally adjust opening amounts of openings that are fluidically communicating with the first and second heat-exchange pipelines 310 and 320 to 100%, and may adjust opening amounts of openings that are fluidically communicating with the second supply pipeline to 0%.

Due to the flow rate control valve 150, the fuel may no longer be supplied to the plurality of storage tanks 110, and heat may be exchanged between the plurality of storage tanks 110 and the first and second heat-exchange pads 210 and 220. Thereafter, the heat may be transferred to the fuel that flows through the first and second heat-exchange pipelines 310 and 320, through the first and second heat-exchange pads 210 and 220. According to the present principle, the plurality of storage tanks 110 may transfer the heat to the fuel, and the temperature of the storage tank 110 may decrease.

When the temperature of the storage tank 110 decreases after the flow rate control valve 150 supplies the fuel to the first and second heat-exchange pipelines 310 and 320, the processor is configured for controlling the flow rate control valve 150 to gradually increase the flow rate of the fuel supplied to the storage tank 110 again and gradually decrease the flow rate of the fuel supplied to the heat-exchange pipeline 300 again.

Accordingly, the flow rate control valve 150 may adjust the flow rate of the fuel supplied to the second supply pipeline 170 and the first and second heat-exchange pipelines 310 and 320 by adjusting opening amounts of the openings that are fluidically communicating with the second supply pipeline 170 and the first and second heat-exchange pipelines 310 and 320 internally, respectively.

Thereafter, the processor is configured for controlling the flow rate control valve 150 to maintain the flow rate of the fuel supplied to the storage tank 110 and the flow rate of the fuel supplied to the heat-exchange pipeline 300 when the temperature of the storage tank 110 is maintained. In other words, the flow rate control valve 150 may internally maintain the opening amounts of the openings that are fluidically communicating with the second supply pipeline 170 and the first and second heat-exchange pipelines 310 and 320, respectively.

When the temperature of the storage tank 110 increases to the reference temperature or higher than the reference temperature or is maintained at the reference temperature or higher than the reference temperature for a predetermined time period after the flow rate control valve 150 supplies the fuel to the first and second heat-exchange pipelines 310 and 320, the processor is configured for controlling the signal transmitter 130 to transmit a charging stop signal to the charging station 10. Here, the specific time period may be about 10 s.

By the present principle, the fuel charging module 100 can continuously receive the fuel until the fuel is supplied from the charging station 10 and the temperature of the storage tank 110 reaches the reference temperature. Thereafter, when the temperature of the storage tank 110 reaches the reference temperature or is more than the reference temperature, the fuel charging module 100 does not stop supplying the fuel, but rather may cause the fuel to flow to the first and second heat-exchange pipelines 310 and 320. When the temperature of the storage tank 110 decreases to less than the reference temperature, the fuel charging module 100 may gradually increase the amount of the fuel supplied to the storage tank 110, increasing an overall fuel charging speed.

When the temperature of the storage tank 110 does not decrease from the reference temperature, charging by the fuel charging module 100 may be stopped by transmitting a charging stop signal to the charging station 10 in the signal transmitter 130.

Meanwhile, the fuel charging module 100 may further include a recovery pipeline 500 for recovering the fuel that flows through the first and second heat-exchange pipelines 310 and 320 to the charging station 10.

Each of the first and second heat-exchange pipelines 310 and 320 may include one end portion which is connected to the flow rate control valve 150 and an opposite end portion extending from the one end portion and is formed on an opposite side to the one end portion. Accordingly, the recovery pipeline 500 may connect an opposite end portion of each of the first and second heat-exchange pipelines 310 and 320 and the charging station 10.

Figure 4:
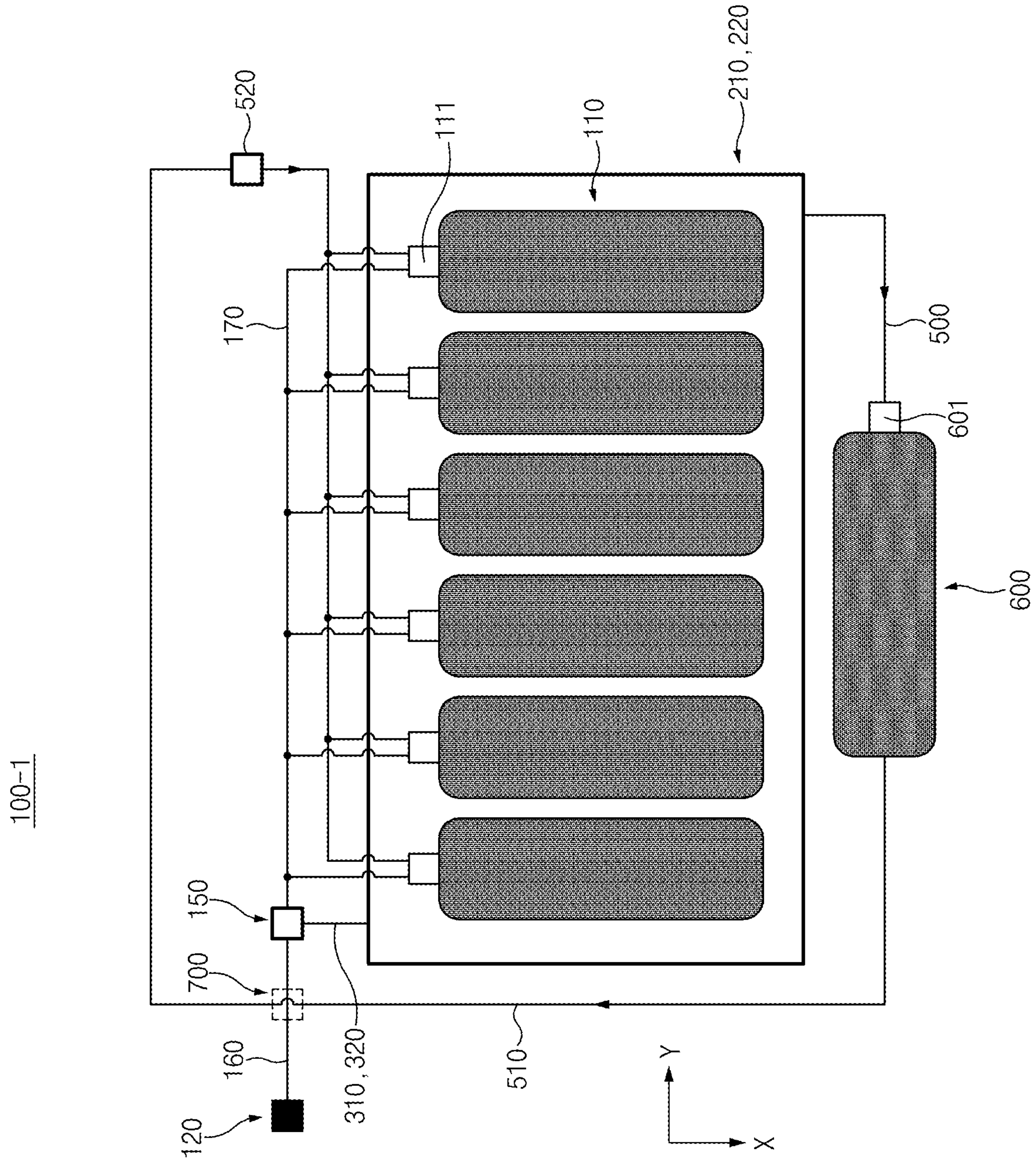
FIG. 4 is a schematic view of a fuel charging module according to another exemplary embodiment of the present disclosure.

FIG. 4 is a schematic view of a fuel charging module according to another exemplary embodiment of the present disclosure.

Referring to FIG. 4, the fuel charging module 100-1 may further include a recovery pipeline 500 connected to opposite end portions of the first and second heat-exchange pipelines 310 and 320, a sub pipeline 510, an opening/closing valve 520, a sub tank 600, and a heat-exchange portion 700, in addition to the components of the fuel charging module 100 illustrated in FIG. 1. The description of FIG. 1 is used for the remaining components of the fuel charging module 100-1 of FIG. 4.

The fuel charging module 100-1 does not recover the fuel from the heat-exchange pipelines 310 and 320 to cause it to flow to the charging station 10 as illustrated in FIG. 1, but rather may recover the fuel from the first and second heat-exchange pipelines 310 and 320 and may supply it to the plurality of storage tanks 110 again.

The recovery pipeline 500 may extend from the first and second heat-exchange pipelines 310 and 320 to the sub tank 600. The sub tank 600 may accommodate the fuel which is recovered through a sub inlet 601 connected to the recovery pipeline 500. The sub tank 600 may be spaced apart from the heat-exchange pad 200 (see FIG. 1).

The sub tank 600 may be connected to the sub pipeline 510. The fuel accommodated in the interior of the sub tank 600 may flow through the sub pipeline 510. The sub pipeline 510 may connect the sub tank 600 and the plurality of storage tanks 110 to supply the fuel accommodated in the sub tank 600 to the storage tanks 110.

The sub pipeline 510 may connect the sub tank 600 and the plurality of storage tanks 110, and a heat-exchange portion 700 and an opening/closing valve 520 may be provided on the sub pipeline 510.

In an exemplary embodiment of the present disclosure, the heat-exchange portion 700 may be positioned on a location, where the supply pipeline 160 crosses the sub pipeline 510.

Accordingly, the heat-exchange portion 700 may be configured to exchange heat between the fuel recovered through the recovery pipeline 500 and the fuel supplied from the charging station 10 (see FIG. 1). In more detail, in FIG. 4, the heat-exchange portion 700 may be configured to exchange heat between the fuel that flows through the sub pipeline 510 and the fuel which is supplied from the charging station 10. By the heat-exchange portion 700, the temperature of the fuel that flows through the sub pipeline 510 may be lowered, and the temperature of the fuel which is supplied from the charging station 10 may be increased.

The opening/closing valve 520 may be provided with a solenoid valve, and the like, and may open or close an internal passage of the sub pipeline 510. The opening/closing valve 520 may be controlled by a processor of the controller 400 (see FIG. 1).

The heat-exchange portion 700 may be located on an upstream side of the opening/closing valve 520 with respect to a flow direction of the fuel that flows through the sub pipeline 510. However, the present disclosure is not limited thereto, and the heat-exchange portion 700 may be located on a downstream side of the opening/closing valve 520.

The fuel charging module 100-1 may store the fuel in the sub tank 600 separately from the plurality of storage tanks 110, and then may supply the fuel from the sub tank 600 to the storage tank 110 when the fuel in at least one of the plurality of storage tanks 110 is insufficient or an internal pressure of at least one storage tank 110 is lower than the internal pressure of the other storage tanks.

By the present principle, a larger amount of fuel may be accommodated than in a structure with only the storage tank 110 in an interior of the vehicle, and a travel distance of the vehicle may be increased by preventing a pressure imbalance between the storage tanks 110.

Meanwhile, the temperature of the fuel accommodated in the sub tank 600 may be higher than the temperature of the fuel which is introduced into the interior of the storage tank 110, and thus, the fuel may be supplied to the storage tank 110 through the heat-exchange portion 700 at a relatively lower temperature.

The processor is configured to determine the amount of the fuel accommodated in each of the storage tanks 110 through the temperature of each of the storage tanks 110. The temperature sensor and a tank pressure valve may be provided at each of the storage tank 110. The temperature sensor may measure the temperature of the storage tank 110. The pressure measured by each of the storage tanks 110 may be transmitted to the processor provided at the charging station 10. The processor may calculate the amount of fuel using the temperature, pressure and previously known volume. Through this, the processor is configured for controlling the opening/closing valve 520 to open the opening/closing valve 520 so that the fuel may be supplied to the storage tank 110, in which relatively little fuel is stored, through the sub pipeline 510, when the amount of the fuel accommodated in at least one storage tank 110 is less than the amount of the fuel accommodated in another storage tank 110.

However, the present disclosure is not limited thereto, and the amount of the fuel accommodated in the interior of the storage tank 110 may be measured by a separate sensor.

Figure 5:
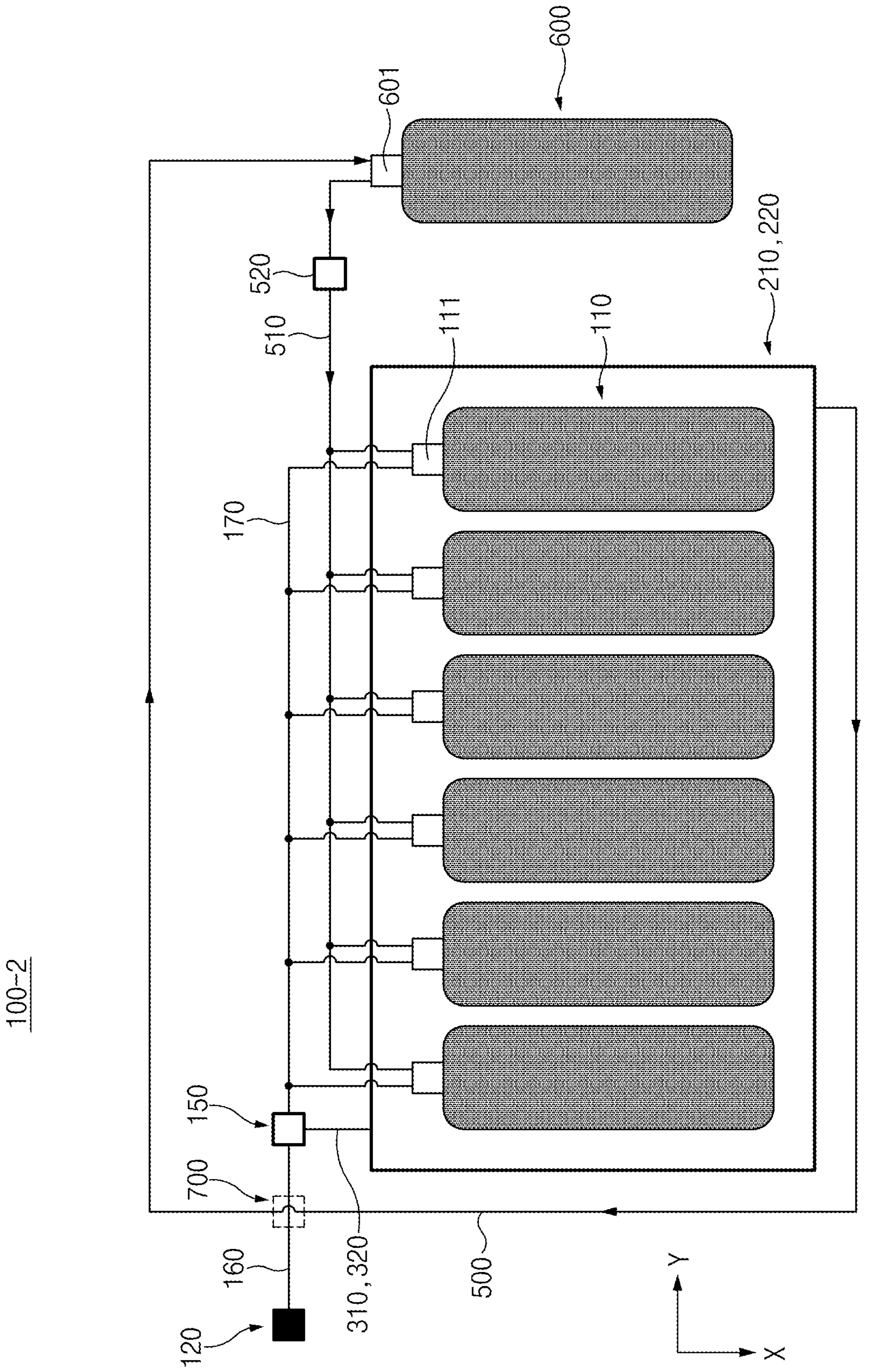
FIG. 5 is a schematic view of a fuel charging module according to another exemplary embodiment of the present disclosure.

FIG. 5 is a schematic view of a fuel charging module according to another exemplary embodiment of the present disclosure.

In the fuel charging module 100-2, compared to the fuel charging module 100-1 illustrated in FIG. 4, disposition of the recovery pipeline 500, the sub pipeline 510, the opening/closing valve 520, the sub tank 600, and the heat-exchange portion 700 may be different.

According to another exemplary embodiment of the present disclosure, the fuel charging module 100-2 does not recover the fuel from the heat-exchange pipelines 310 and 320 to cause it flow to the charging station 10 (see FIG. 1) as illustrated in FIG. 4, and rather, may recover the fuel from the first and second heat-exchange pipelines 310 and 320 and supply it to the plurality of storage tanks 110.

The heat-exchange portion 700 of the fuel charging module 100-2 may be disposed on the recovery pipeline 500 rather than the sub pipeline 510. That is, according to another exemplary embodiment of the present disclosure, the sub tank 600 may accommodate the fuel that has exchanged heat with the fuel supplied through the receptacle 120.

The recovery pipeline 500 may extend from the first and second heat-exchange pipelines 310 and 320 to the sub tank 600. The sub tank 600 may accommodate the fuel which is recovered through the sub inlet 601 connected to the recovery pipeline 500. The sub tank 600 may be spaced apart from the heat-exchange pad 200.

The heat-exchange portion 700 may be configured to exchange heat between the fuel that flows through the recovery pipeline 500 and the fuel supplied from the charging station 10. By the heat-exchange portion 700, the temperature of the fuel that flows through the recovery pipeline 500 may be lowered, and the temperature of the fuel supplied from the charging station 10 may be increased.

The fuel recovered through the recovery pipeline 500 may be accommodated in the interior of the sub tank 600 after heat is exchanged by the heat-exchange portion 700.

The sub tank 600 may be connected to the sub pipeline 510. The fuel accommodated in the interior of the sub tank 600 may flow through the sub pipeline 510. The sub pipeline 510 may connect the sub tank 600 and the plurality of storage tanks 110 to supply the fuel contained in the sub tank 600 to the storage tanks 110.

The sub pipeline 510 may extend from the sub tank 600 to the plurality of storage tanks 110, and an opening/closing valve 520 may be provided on the sub pipeline 510.

The opening/closing valve 520 may be provided with a solenoid valve, and the like. The opening/closing valve 520 may be opened or closed by a processor so that the fuel accommodated in the sub tank 600 may be supplied to the storage tank 110, in which relatively little fuel is stored, through the sub pipeline 510.

The fuel charging module 100-2 may store the recovered fuel in the sub tank 600 separately from the plurality of storage tanks 110, and may cause the fuel to flow from the sub tank 600 when the fuel in at least one of the plurality of storage tanks 110 is insufficient or the internal pressure of at least one storage tank is lower than the internal pressure of the other storage tanks.

By the present principle, a larger amount of fuel may be accommodated than in a structure with only the storage tank 110 in an interior of the vehicle, and a travel distance of the vehicle may be increased by preventing a pressure imbalance between the storage tanks 110.

The processor is configured to determine the amount of fuel accommodated in each of the storage tanks 110, through the temperature of each of the storage tanks 110. Through this, the processor is configured for controlling the opening/closing valve 520 to be opened so that fuel may be supplied to the storage tank 110, in which relatively little fuel is stored through the sub pipeline 510 when the amount of the fuel accommodated in at least one storage tank 110 is less than the amount of fuel accommodated in another storage tank 110.

However, the present disclosure is not limited thereto, and the flow rate of the fuel accommodated in the interior of the storage tank 110 may be measured by a separate sensor.

Hereinafter, a fuel charging method will be described with reference to FIG. 6 and FIG. 7.

Figure 6:
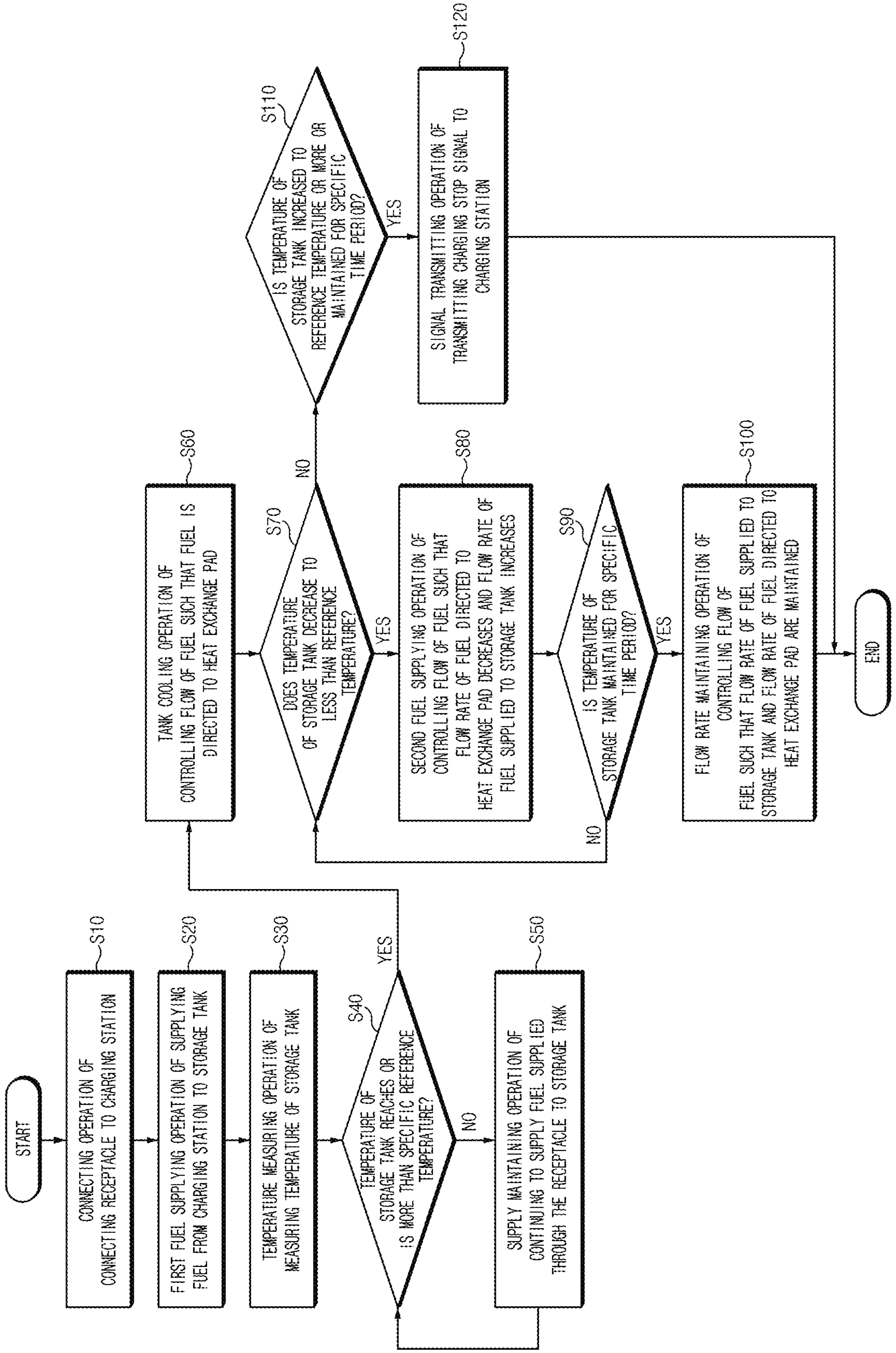
FIG. 6 is a flowchart illustrating a fuel charging method according to an exemplary embodiment of the present disclosure.

FIG. 6 is a flowchart according to the fuel charging method according to an exemplary embodiment of the present disclosure.

Referring to FIGS. 1 to 6, the fuel charging method may include a connecting operation (S10), a first fuel supplying operation (S20), a temperature measuring operation (S30), a first determination operation (S40), a supply maintaining operation (S50), a tank cooling operation (S60), a second determination operation (S70), a second fuel supplying operation (S80), a third determination operation (S90), a flow rate maintaining operation (S100), a fourth determination operation (S110), and a signal transmitting operation (S120).

The connecting operation (S10) may be an operation of connecting the receptacle 120 to the charging station 10. The first fuel supplying operation (S20) may be an operation of supplying a fuel from the charging station 10 to the storage tank 110 after the connecting operation (S10).

The temperature measuring operation (S30) may be an operation of measuring the temperature of the storage tank 110 after the first fuel supplying operation (S20). In the temperature measuring operation (S30), the temperatures of the plurality of storage tanks 110 may be measured with a specific time difference.

In the temperature measuring operation (S30), not only the temperatures of the storage tanks 110 but also the pressures of the storage tanks 11 may be measured. Accordingly, when the pressure of one of the plurality of storage tanks 110 is more than a predetermined reference pressure, the signal transmitter 130 may transmit a charging stop signal to the charging station 10. Accordingly, the predetermined reference pressure may be a pressure value excluding a specific error range from 350 bar*1.5.

The first determination operation (S40) may be an operation of determining the temperature of the storage tank 110 by comparing it with a predetermined reference temperature after the temperature measuring operation. The first determination operation S40 may be an operation of determining whether the temperature of the storage tank 110 reaches or is more than the predetermined reference temperature. Here, the reference temperature may be a temperature excluded from 85 degrees Celsius by a specific error range.

The supply maintaining operation (S50) may be an operation of maintaining the flow rate of the fuel supplied to the storage tank 110 so that the fuel supplied through the receptacle 120 continues to be supplied to the storage tank 110 when the temperature of the storage tank 110 is less than the reference temperature (No of S40).

Even after the supply maintaining operation (S50), the first determination operation (S40) of determining whether the temperature of the storage tank 110 reaches the reference temperature or is more than the reference temperature may be performed again.

The tank cooling operation (S60) may be an operation of controlling the flow of the fuel so that the fuel supplied through the receptacle 120 is directed to the heat-exchange pad 200 when the temperature of the storage tank 110 reaches or is more than the reference temperature (an example of S40). The tank cooling operation (S60) may include controlling the flow of the fuel so that all the fuel supplied through the receptacle 120 is directed to the heat-exchange pad 200.

The second determination operation (S70) may be an operation of determining whether the temperature of the storage tank 110 decreases from the reference temperature after the tank cooling operation (S60).

The second fuel supplying operation (S80) may be an operation of controlling the flow of the fuel to decrease the flow rate of the fuel which is directed to the heat-exchange pad 200 and increase the flow rate of the fuel supplied to the storage tank 110 when the temperature of the storage tank 110 decreases from the reference temperature in the second determination operation (S70) (an example of S70).

The third determination operation (S90) may be an operation of determining whether the temperature of the storage tank 110 is maintained within a specific range for a predetermined time period after the second fuel supplying operation (S80). Accordingly, maintaining the temperature of the storage tank 110 within a specific range for a predetermined time period may mean that the temperature of the storage tank 110 is measured at a time difference and a difference between the two temperatures is within a specific error range. Here the time difference may be 10 ms.

The flow rate maintaining operation (S100) may include an operation of controlling the flow of the fuel to maintain the flow rate of the fuel supplied to the storage tank 110 and the flow rate of the fuel which is directed to the heat-exchange pad 200 when the temperature of the storage tank 110 is maintained for a predetermined time period (an example of S90) in the third determination operation (S90).

In the third determination operation (S90), when the temperature of the storage tank 110 is not maintained for a predetermined time period (No of S90), the second determination operation (S70) of determining whether the temperature of the storage tank 110 decreases to less than the reference temperature may be performed again.

The fourth determination operation (S110) may be an operation of determining whether the temperature of the storage tank 110 increases to the reference temperature or higher than the reference temperature or is maintained at the reference temperature or higher than the reference temperature for a predetermined time period when the temperature of the storage tank 110 does not decrease (No of S70) in the second determination operation (S70). Here, the specific time period may be about 10 s.

The signal transmitting operation (S120) may be an operation of transmitting a charging stop signal to the charging station 10 when the temperature of the storage tank 110 increases to the reference temperature or higher than the reference temperature or is maintained at the reference temperature or higher than the reference temperature for a specific time period. Accordingly, it may be determined that there is a problem in the heat-exchange pad 200 or the above-mentioned sensors.

Figure 7:
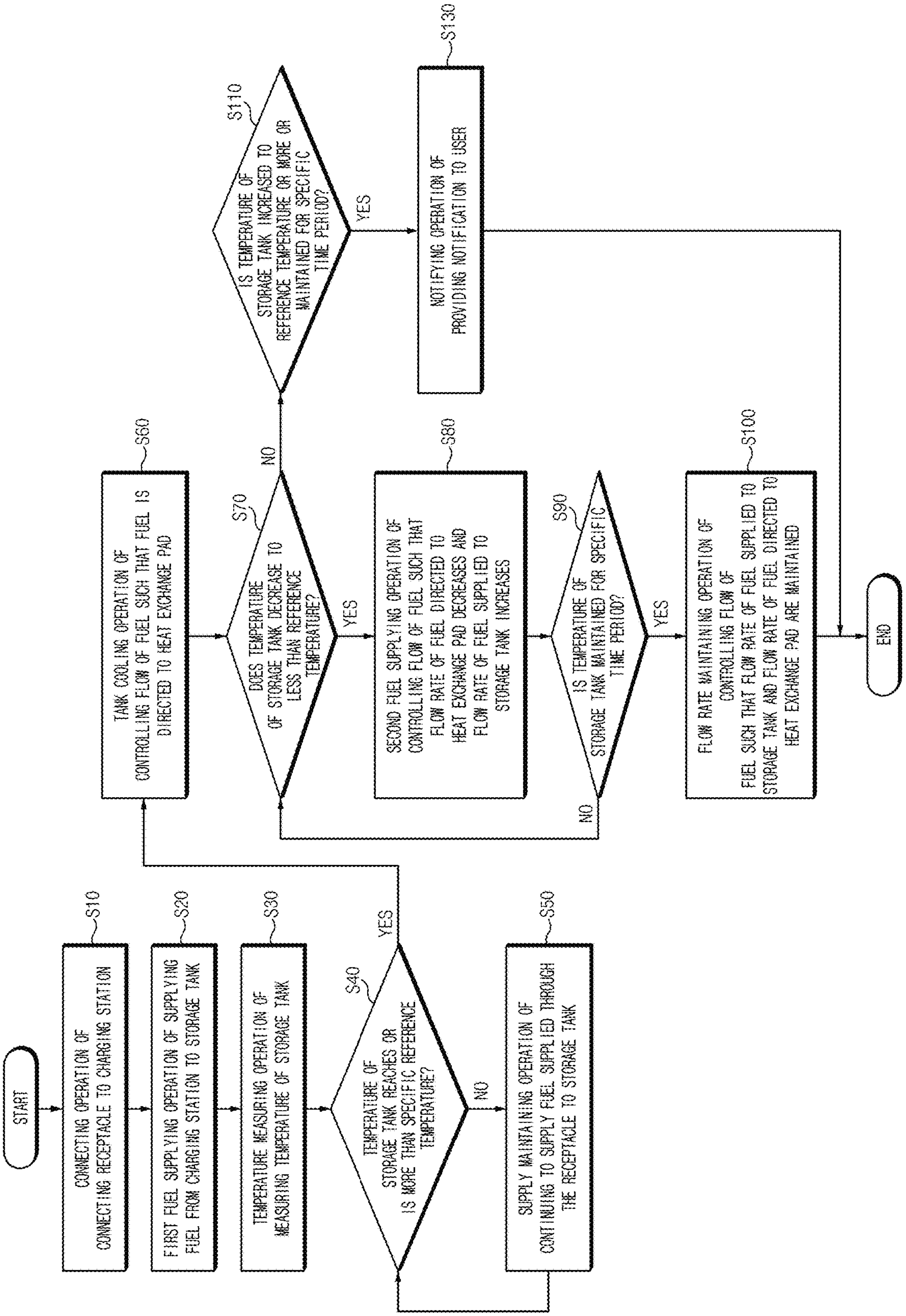
FIG. 7 is a flowchart illustrating a fuel charging method according to another exemplary embodiment of the present disclosure.

FIG. 7 is a flowchart according to a fuel charging method according to another exemplary embodiment of the present disclosure.

The fuel charging method in FIG. 7 is a fuel charging method including a notifying operation (S130) instead of a signal transmitting operation (S120) compared to FIG. 6. Among the operations of the fuel charging method of FIG. 7, for the connecting operation (S10), the first fuel supplying operation (S20), the temperature measuring operation (S30), the first determination operation (S40), the supply maintaining operation (S50), the tank cooling operation (S60), the second determination operation (S70), the second fuel supplying operation (S80), the third determination operation (S90), the flow rate maintaining operation (S100), and the fourth determination operation (S110), the description of FIG. 6 is used.

Referring to FIGS. 1 and 7, the fuel charging method may include the notifying operation (S130). The notifying operation (S130) may include an operation of providing a notification to the user when the temperature of the storage tank 110 increases to the reference temperature or higher than the reference temperature or is maintained at the reference temperature or higher than the reference temperature for a predetermined time period (an example of S110) in the fourth determination operation (S110). The specific time period here may also be about 10 s.

When charging of the charging module 10 begins, the signal transmitter 130 may transmit the temperature of the storage tank 110, the pressure of the storage tank 110 to the charging station 10 using infrared rays. The processor may constantly monitor the pressure of the storage tank 110, the temperature of the storage tank 110, and supplied flow rate of the storage tank 110.

When the fourth determination operation is detected by the processor, the first supply pipeline 160, the inlet 111 are blocked and a charging stop signal may be sent to the charging station 10 to block the hydrogen supply. After this, the phrase "tank temperature abnormal during charging" may pop up on the vehicle cluster, and a related phrase or code may similarly pop up at the charging station.

According to the fuel charging module 100, 100-1, and 100-2 and the fuel charging method described above, because the fuel charging speed may be optimized while the safety of the storage tank 110 is ensured, the fuel charging time may be shortened, and thus, user convenience may be improved.

This technology may optimize the charging speed of the fuel while the safety of the storage tank is ensured, and thus, the fuel charging time may be shortened.

Additionally, according to the present technology, the fuel that flows through the heat-exchange pipeline may be reused, and thus, fuel consumption may be lowered.

Furthermore, the present technology may allow more fuel to be charged to the storage tank through the sub tank and prevent a pressure imbalance between the plurality of storage tanks, and thus, the travel distance of the vehicle may be increased.

Furthermore, various effects which may be directly or indirectly identified through the present specification may be provided.

The above description is a simple exemplary description of the technical spirits of the present disclosure, and an ordinary person in the art, to which the present disclosure pertains, may make various corrections and modifications without departing from the essential characteristics of the present disclosure.

The storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Software implementations may include software components (or elements), object-oriented software components, class components, task components, processes, functions, attributes, procedures, subroutines, program code segments, drivers, firmware, microcode, data, database, data structures, tables, arrays, and variables. The software, data, and the like may be stored in memory and executed by a processor. The memory or processor may employ a variety of means well-known to a person including ordinary knowledge in the art.

Furthermore, the terms such as "unit", "module", etc. included in the specification mean units for processing at least one function or operation, which may be implemented by hardware, software, or a combination thereof.

In the flowchart described with reference to the drawings, the flowchart may be performed by the controller or the processor. The order of operations in the flowchart may be changed, a plurality of operations may be merged, or any operation may be divided, and a specific operation may not be performed. Furthermore, the operations in the flowchart may be performed sequentially, but not necessarily performed sequentially. For example, the order of the operations may be changed, and at least two operations may be performed in parallel.

Hereinafter, the fact that pieces of hardware are coupled operatively may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A fuel charging module comprising:

a storage tank configured to store a fuel;

a supply pipeline connected to the storage tank and configured to supply the fuel supplied from a charging station, to the storage tank;

a flow rate control valve mounted on the supply pipeline;

a heat-exchange pad contacting with the storage tank for exchange of heat with the storage tank; and a heat-exchange pipeline connected to the flow rate control valve and the heat-exchange pad, and configured to supply the fuel to the heat-exchange pad, wherein the flow rate control valve is configured to supply the fuel supplied through the charging station, to the storage tank or the heat-exchange pad.

2. The fuel charging module of claim 1, wherein the heat-exchange pipeline is inserted into an interior of the heat-exchange pad.

3. The fuel charging module of claim 1, wherein the storage tank is in plural, wherein the plurality of storage tanks extend in a first direction, and the plurality of storage tanks are disposed in a second direction intersecting the first direction, and wherein the heat-exchange pad includes:

accommodation recesses disposed on opposite sides of the plurality of storage tanks in a third direction intersecting the first direction and the second direction to accommodate the plurality of storage tanks therein; and support portions formed on sides of the accommodation recesses in the second direction to support sides of the storage tanks in the second direction, and into which the heat-exchange pipeline is inserted.

4. The fuel charging module of claim 3, wherein the plurality of support portions are spaced apart from each other in the second direction and the accommodation recesses are interposed between the plurality of support portions, and wherein the heat-exchange pipeline extends to pass through the plurality of support portions in the first direction.

5. The fuel charging module of claim 2, further including:

a temperature detecting sensor configured to detect a temperature of the storage tank; and a processor operatively connected to the flow rate control valve and configured to control the flow rate control valve so that a flow rate of the fuel supplied from the charging station to the storage tank is adjusted in response that the temperature of the storage tank reaches a reference temperature.

6. The fuel charging module of claim 5, wherein the processor is further configured to control the flow rate control valve so that supply of the fuel to the storage tank is stopped and the fuel is supplied to the heat-exchange pipeline in response that the temperature of the storage tank reaches the reference temperature.

7. The fuel charging module of claim 6, wherein the processor is further configured to control the flow rate control valve to increase the flow rate of the fuel supplied to the storage tank, and decrease the flow rate of the fuel supplied to the heat-exchange pipeline, in response that the temperature of the storage tank decreases to less than the reference temperature after the flow rate control valve is operated to supply the fuel to the heat-exchange pipeline.

8. The fuel charging module of claim 6, further including:

a signal transmitter configured to transmit a signal to the charging station, wherein the processor is further configured to control the signal transmitter to transmit a charging stop signal to the charging station in response that the temperature of the storage tank is increased or maintained for a predetermined time period after the flow rate control valve is operated to supply the fuel to the heat-exchange pipeline.

9. The fuel charging module of claim 1, wherein the heat-exchange pipeline includes one end portion connected to the flow rate control valve, and an opposite end portion extending from the one end portion and formed on an opposite side to the one end portion, and wherein the fuel charging module further includes a recovery pipeline connecting the opposite end portion of the heat-exchange pipeline and the charging station.

10. The fuel charging module of claim 1, wherein the heat-exchange pipeline includes one end portion connected to the flow rate control valve and an opposite end portion extending from the one end portion and formed on an opposite side to the one end portion, and wherein the fuel charging module further includes:

a recovery pipeline connected to the opposite end portion of the heat-exchange pipeline; and a heat-exchange portion configured to exchange heat between the fuel recovered through the recovery pipeline and the fuel supplied from the charging station.

11. The fuel charging module of claim 10, further including:

a sub tank connected to the recovery pipeline, and spaced apart from the heat-exchange pad to accommodate the fuel recovered through the recovery pipeline;

a sub pipeline connecting the sub tank and the storage tank to supply the fuel accommodated in the sub tank to the storage tank; and an opening/closing valve disposed on the sub pipeline.

12. The fuel charging module of claim 10, wherein the heat-exchange portion is positioned on a location, where the supply pipeline crosses the sub pipeline.

* * * * *